United States Patent
Yasumura et al.

(10) Patent No.: US 10,895,702 B2
(45) Date of Patent: Jan. 19, 2021

(54) INTEGRATED HEATER STRUCTURES IN A PHOTONIC INTEGRATED CIRCUIT FOR SOLDER ATTACHMENT APPLICATIONS

(71) Applicant: Google LLC, Mountain View, CA (US)

(72) Inventors: Kevin Yasumura, Lafayette, CA (US); Lieven Verslegers, San Mateo, CA (US); Jill Berger, Saratoga, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/371,800

(22) Filed: Apr. 1, 2019

(65) Prior Publication Data

US 2020/0310053 A1    Oct. 1, 2020

(51) Int. Cl.
*G02B 6/42* (2006.01)
*G02B 6/34* (2006.01)
*H05B 3/12* (2006.01)
*H05B 3/03* (2006.01)
*B23K 1/00* (2006.01)

(52) U.S. Cl.
CPC .............. *G02B 6/4266* (2013.01); *B23K 1/00* (2013.01); *G02B 6/34* (2013.01); *G02B 6/4225* (2013.01); *G02B 6/4238* (2013.01); *H05B 3/03* (2013.01); *H05B 3/12* (2013.01)

(58) Field of Classification Search
CPC .. G02B 6/4266; G02B 6/4238; G02B 6/4225; G02B 6/34; H05B 3/12; H05B 3/03; B23K 1/00
See application file for complete search history.

(56) References Cited

U.S. PATENT DOCUMENTS

| 6,292,499 | B1* | 9/2001 | Pearson | H01S 3/09415 372/107 |
|---|---|---|---|---|
| 9,244,231 | B2 | 1/2016 | Arimoto et al. | |
| 2002/0181897 | A1 | 12/2002 | Mowry et al. | |
| 2008/0044128 | A1 | 2/2008 | Kish et al. | |
| 2012/0195332 | A1 | 8/2012 | Yoffe et al. | |
| 2015/0063745 | A1 | 3/2015 | Lin et al. | |

(Continued)

FOREIGN PATENT DOCUMENTS

| EP | 3059622 A1 | 8/2016 |
|---|---|---|
| TW | 201901208 A | 1/2019 |

OTHER PUBLICATIONS

International Search Report and Written Opinion for International Application No. PCT/US2019/061428 dated Feb. 7, 2020. 18 pages.

(Continued)

*Primary Examiner* — John Bedtelyon
(74) *Attorney, Agent, or Firm* — Lerner, David, Littenberg, Krumholz & Mentlik, LLP (57) ABSTRACT

An apparatus including a photonic integrated circuit (PIC) coupled to an optical bench is disclosed. The PIC includes at least one grating coupler disposed thereon and the optical bench includes an optical system disposed thereon. The apparatus also includes an integrated heater at an upper surface of the PIC under the optical bench or at a bottom surface of the optical bench over the PIC. The apparatus also includes a layer of solder disposed between the PIC and the optical bench for coupling the bottom surface of the optical bench to the PIC. In some implementations, the layer of solder is in thermal communication with the integrated heater.

24 Claims, 8 Drawing Sheets

(56) References Cited

U.S. PATENT DOCUMENTS

| | | |
|---|---|---|
| 2016/0294155 A1 | 10/2016 | Zheng et al. |
| 2019/0044002 A1 | 2/2019 | Byrd et al. |
| 2019/0049677 A1 | 2/2019 | Yasumura et al. |
| 2019/0113697 A1* | 4/2019 | Li .......................... G02B 6/30 |

OTHER PUBLICATIONS

"imec-ePIXfab SiPhotonics: iSiPP50G" Europractice, http://www.europractice-ic.com/SiPhotonics_technology_imec_ISIPP50G.php.
Office Action for Taiwanese Patent Application No. 108143363 dated Aug. 17, 2020. 3 pages.

* cited by examiner

INTEGRATED HEATER STRUCTURES IN A PHOTONIC INTEGRATED CIRCUIT FOR SOLDER ATTACHMENT APPLICATIONS

BACKGROUND

Silicon photonics is an emerging technology that promises to deliver low-cost, low-power, high-speed optical solutions for data and telecommunication. Silicon photonic technology enables scaling of transceiver channels and speeds through integration of photonic and electronic components. Innovative techniques and methods of integrating the photonic and electronic components are needed in advancing various aspects of the emerging silicon photonic technology.

SUMMARY

At least one aspect is directed to a photonic apparatus. The apparatus includes a photonic integrated circuit (PIC) having at least one grating coupler disposed on the PIC. The apparatus also includes an optical bench having an optical system disposed on a top surface of the optical bench. The apparatus also includes an integrated heater at an upper surface of the PIC under the optical bench or at a bottom surface of the optical bench over the PIC. The apparatus also includes a layer of solder disposed between the PIC and the optical bench for coupling the bottom surface of the optical bench to the PIC. In some implementations, the layer of solder is in thermal communication with the integrated heater.

In some implementations of the apparatus, the optical bench is positioned on the PIC to align the optical system to the at least one grating coupler of the PIC. In some implementations, the integrated heater comprises tungsten, titanium nitride or doped silicon. In some implementations, the integrated heater has a plurality of segments with varying filament dimensions and has a thickness from about 100 nm to about 10 μm or has a meandering or serpentine structure having a width from about 100 nm to about 10 μm.

In some implementations, the integrated heater is at the bottom surface of the optical bench and in thermal communication with the layer of solder. In some implementations, the integrated heater is at the upper surface of the PIC. In some implementations, the apparatus further includes a second integrated heater at the bottom surface of the optical bench on an opposite side of the layer of solder from the integrated heater. In some implementations, the integrated heater is a first integrated heater, the apparatus further comprises a second integrated heater, wherein the second integrated heater is electrically isolated from the first integrated heater.

In some implementations, the optical bench is a first optical bench, the apparatus further comprises a second optical bench and a second layer of solder disposed between the PIC and the second optical bench for coupling the second optical bench to the PIC.

In some implementations, the bottom surface of the optical bench or the top surface of the PIC has one of an antireflective coating or an optical path link up epoxy.

At least one aspect is directed to a method of assembling a photonic assembly. The method includes providing a photonic integrated circuit (PIC) having at least one grating coupler disposed thereon. The method includes providing an optical bench having an optical system disposed thereon. The method includes providing an integrated heater at an upper surface of the PIC or at a bottom surface of the optical bench. The method includes providing a layer of solder between the PIC and the optical bench at the integrated heater.

The method also includes positioning the optical bench on top of the layer of solder. The method also includes aligning the optical system to the grating coupler by adjusting a position of the optical bench relative to the PIC. The method further includes heating the integrated heater to melt and reflow the solder between the PIC and the optical bench. The method then includes cooling the solder, allowing it to solidify, thereby securing attachment between the PIC and the optical bench.

In some implementations, prior to the cooling of the solder, the method further includes adjusting the position of the optical bench relative to the PIC while the solder is molten. In some implementations, the adjusting includes moving or rotating the optical bench so as to further align the optical system to the grating coupler. In some implementations, the heating of the integrated heater includes applying a current across the integrated heater.

In some implementations, the method further includes determining a misalignment between the optical system and the grating coupler. In some implementations, the method further includes realigning the optical system on the optical bench with the grating coupler on the PIC in response to the misalignment between the optical system and the grating coupler. In some implementations, the method further includes re-melting a solidified solder between the PIC and the optical bench by applying a current across the integrated heater.

In some implementations, the method further includes repositioning of the optical bench relative to the PIC while the solder is molten so as to further re-align the optical system to the grating coupler.

In some implementations, the integrated heater is at the bottom surface of the optical bench and in thermal communication with the layer of solder. In some implementations, the integrated heater is at the upper surface of the PIC.

In some implementations, the integrated heater is a first integrated heater and the photonic assembly further includes a second integrated heater, wherein the second integrated heater is electrically isolated from the first integrated heater. In some implementations, the optical bench is a first optical bench, the layer of the solder is a first layer of solder, the apparatus further comprises a second optical bench and a second layer of solder. In some implementations, the method further includes disposing the second layer of solder between the second integrated heater and the second optical bench. In some implementations, the method further includes disposing the second layer of solder between the PIC and the second optical bench adjacent the second integrated heater, heating the second integrated heater so as to melt and reflow the second layer of solder between the PIC and the second optical bench, and cooling the second layer of solder, allowing the second layer of solder to solidify, thereby securing attachment between the PIC and the second optical bench.

In some implementations, the method further includes detecting a misalignment of the second optical bench, reheating the second layer of solder, without reheating the layer of solder, to melt the second layer of solder, realigning the second optical bench while the second layer of solder has been re-melted, and allowing the second layer of solder to cool to a solid state, reestablishing the connection between the PIC and the second optical bench.

At least one aspect is directed to a photonic apparatus. The apparatus includes a photonic integrated circuit (PIC) having a plurality of grating couplers disposed on the PIC. The apparatus includes a plurality of optical benches, each having an optical system disposed on its surface and corresponding to one of the plurality of grating couplers. The apparatus includes a plurality of integrated heaters, each located at an upper surface of the PIC under a corresponding optical bench or at a bottom surface of the corresponding optical bench over the PIC. In some implementations, the plurality of integrated heaters are electrically isolated from one another. The apparatus includes at least one layer of solder disposed between the PIC and the at least one optical bench for coupling the bottom surface of the at least one optical bench to the PIC. In some implementations, a plurality of layers of solder disposed between the PIC and corresponding optical benches for coupling the plurality of optical benches to the PIC.

In some implementations, the plurality of optical benches are positioned on the PIC so as to align the optical systems on each optical bench to corresponding grating couplers of the plurality of grating couplers.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

The disclosure relates to methods of assembling silicon photonics apparatus and the devices resulting from such assembly. The disclosure relates to silicon photonic integrated circuits with heater structures integrated therein for soldering optical benches to photonic integrated circuits (PICs) containing grating couplers. In particular, the silicon photonic integrated circuits as disclosed herein include optical benches having optical systems disposed thereon and PICs having integrated heaters and layers of solder disposed between the optical benches and the integrated heaters. In various implementations described herein, the optical benches are soldered to the PICs by application of heat from the integrated heaters to melt and reflow the solder. In various implementations, prior to heating the solder, the optical systems disposed on the optical benches are aligned to the grating couplers on the PICs. Upon cooling to solidify the solder, the optical benches are securely attached to the PICs with a suitable alignment in place between the optical systems and the grating couplers.

In silicon photonic technology, a key performance metric is the light coupling efficiency of a PIC. When light is transmitted between a light source and a PIC, or between the PIC and an optical fiber at the fiber input and fiber output of a transceiver, the coupling efficiency of the light between these components significantly impacts how well the PIC functions. Accordingly, one key parameter to achieve improved performance is to increase the light coupling efficiency between these components. In a functioning PIC, an improved light coupling efficiency can be achieved when improved alignment between the components is attained and maintained so that the beam of light is transmitted with reduced coupling loss from a light transmitting component, such as the light source or an optical system, to a light receiving component, such as a transceiver or a grating coupler on the PIC. However, one of the challenges in the integration of the components in silicon photonics is that in order to improve and maintain an improved light coupling efficiency, improved alignment between these components is needed and maintained for the lifespan of the silicon photonic chips.

Traditionally, an epoxy is used to form a physical connection between PICS and optical benches to set and maintain their alignment during manufacturing and over the course of usage. Using epoxy is not ideal in silicon photonic chips because it is not a good thermal conductor and for that reason, it does not help with dissipation of, for example, heat generated from an on-chip laser source. In addition, epoxies can be moisture sensitive and can swell, particularly in elevated temperature environments. Epoxies are adhesives used mainly for structural purposes to secure components in place. Since epoxies are chemical processes that take time to cure to reach their full projected properties, i.e., to fully harden, the use of epoxies requires components to not shift or move during the curing. In some instances, laser heating can be used to accelerate the curing of epoxy; however, laser heating can have the unintended side-effect of damaging other components on the photonic chip, of optical bench, or causing shifts in the alignment.

Once an epoxy is cured and the components are fixed in their intended positions, they cannot be further manipulated since the epoxy cannot be uncured. Therefore, any misalignment of the components, for example, due to slight shifts of the orientations or movements between components, during the curing process may inadvertently lead to poor-performing silicon photonic chips. Even if a proper alignment is initially set and all components are secured in their respective positions on a PIC, the alignment can still deteriorate over time due to, for example, moisture absorption and swelling of the bonding epoxy. Since the use of epoxy disables any further adjustments possible, the degradation of misalignment cannot be stopped or reversed, and can lead to shortening of the service life of the PIC. This issue is exacerbated if a silicon photonic integrated device includes multiple optical benches coupled to a given PIC. In such a device, any misalignment of any one bench may require replacement of the entire device.

The use of a solder can overcome the short-comings of epoxy. As described herein, a solder can be used to secure the components in silicon photonic integrated circuits after an alignment is set during manufacturing and/or over the course of usage of the PIC. Since solder is insensitive to moisture, it does not swell or alter its physical or chemical structure in a moist environment, and therefore, potential misalignment over the course of service due to moisture can be eliminated. Since a solder is a metal alloy, it has a higher thermal conductivity to help with heat dissipation in silicon photonic chips.

A typical soldering process includes the use of elevated temperature to melt the solder between at least two components to attach the components upon re-solidification of the solder. Upon reapplication of heat, the solder can be re-melted, reflowed, and re-solidified. The possibility to reverse previously formed physical connections enables re-adjusting of the alignment in silicon photonic chips, which is currently not possible with the use of epoxy. The capability to readjust the alignment simply by application of heat to the solidified solder will help increase the yield of silicon photonic integrated circuits, particularly for devices with multiple optical benches coupled thereto, during manufacturing and prolong the service life of the photonic chips.

In order to enable highly effective localized heating of the solder, a heater for melting the solder is integrated with a PIC as described herein. For example, the heater can be placed on or fabricated in the PIC via any suitable method. Placing an integrated heater on the PIC allows for local heating of the PIC surface upon which a layer of solder has been deposited (e.g., via physical, chemical or any suitable deposition techniques), plated (e.g., via electroplating) or placed (e.g., a preform solder). The integrated heater allows for precise control of the region that undergoes solder reflow without affecting any other parts or components of the PIC. The use of solder and the integrated heater for localized heating is particularly advantageous when coupling a light from an optical system on an optical bench to a grating coupler on the PIC where alignment is achieved by placing and securely attaching the optical bench in close proximity to a grating coupler or highly temperature sensitive components.

As disclosed herein, various implementations of soldering an optical bench to a PIC are described. According to various implementations, the optical bench has an optical system with various optical components and a laser die/source disposed on its top surface and the PIC has at least one grating coupler. In some implementations, the PIC includes a heater integrated in a region where the optical bench is to be attached. By integrating the heater under the optical bench attachment region, the heater can be used to melt and reflow a solder that has been placed between the optical bench and the PIC. In some implementations as disclosed herein, the heater covers an entire attachment region. In some implementations as disclosed herein, the heater covers a portion of the attachment region.

The following figures and descriptions with respect to the figures provide additional details of the various implementations of the device and the methods for producing the same.

Figure 1A:
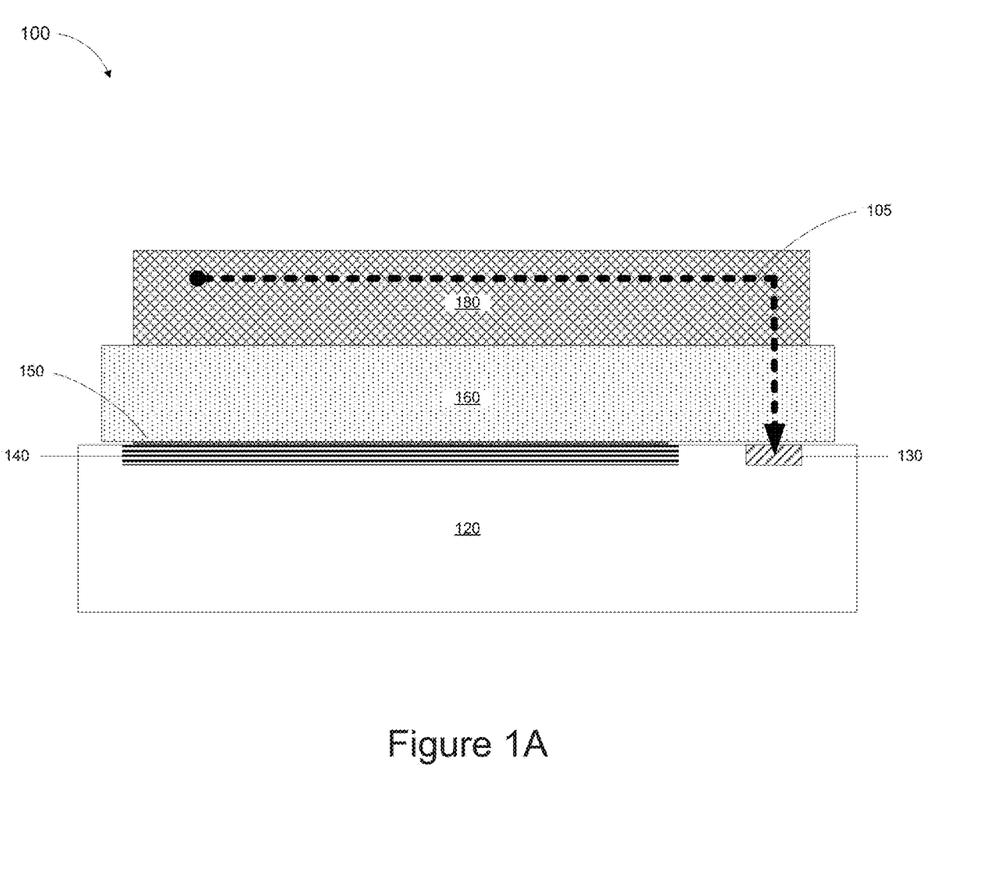
FIG. 1A shows a cross-sectional view of an implementation of a silicon photonic integrated system, according to an illustrative implementation.

FIG. 1A shows a cross-sectional view of an implementation of a silicon photonic apparatus 100 including an integrated heater. The apparatus 100 includes a photonic integrated circuit (PIC) 120, a grating coupler 130 and an integrated heater 140 disposed on the PIC 120, a layer of solder 150, an optical bench 160, and an optical system 180 disposed on the optical bench 160. FIG. 1A also shows a light path 105 from a light source (not shown) in the optical system 180 that is directed onto the grating coupler 130 of the PIC 120.

In some implementations, the PIC 120 includes silicon. In some implementations, the PIC 120 can be a silicon substrate, silicon-on-insulator substrate, silicon nitride coated silicon substrate, silicon oxide coated silicon substrate. In some implementations, the PIC 120 includes components, such as, for example, electrical lines, electrical contact pads, waveguides, grating couplers, edge couplers, modulators, anti-reflection coatings, optical path linkup epoxy, and other optical and electrical components. In some implementations, the PIC 120 includes different waveguide geometries, such as rib, strip, or any suitable photonic or optical components, including, for example, lenses, isolators, prisms, and rotatable Micro-Electro-Mechanical-System (MEMS) components, such as mirrors, mux, demux, polarization splitter/rotator, splitters, taps, photodiodes, phase shifters, resistors.

In some implementations, the grating coupler 130 couples a beam of light from a laser source in the optical system 180 to a waveguide (not shown) on the PIC 120 or between the waveguide on the PIC 120 to an optical fiber (not shown) elsewhere. In some implementations, the grating coupler 130 acts as an antenna by redirecting or diffracting the incoming light. In some implementations, the grating coupler 130 is disposed on the PIC 120. In some implementations, the grating coupler 130 is integrated in the PIC 120. In some implementations, the grating coupler 130 is fabricated within the PIC 120. In some implementations, the grating coupler 130 has a leveled surface flush with the surface of the PIC 120. In some implementations, the grating coupler 130 is defined in a silicon on insulator (SOI) layer. In some implementations, the grating coupler 130 is defined in a polysilicon layer. In some implementations, the grating coupler 130 can be defined by one or multiple etch steps, including partial and/or full etch steps. In some implementations, the grating coupler 130 can also be defined in a silicon nitride layer, typically above the SOI layer.

In some implementations, the integrated heater 140 is disposed on the PIC 120. In some implementations, the integrated heater 140 is fabricated on a top surface of the PIC 120. In some implementations, the integrated heater 140 is fabricated within the PIC 120. In some implementations, the integrated heater 140 has a leveled surface flushed with the surface of the PIC 120. In some implementations, the integrated heater 140 is an embedded heater. In other words, the integrated heater 140 is embedded in the PIC 120. In some implementations, the integrated heater 140 is disposed near the grating coupler 130 to reduce the impact of any solidification forces on the position of the critical optical bench to grating coupler 130. In some implementations, a second integrated heater 140 in addition to the integrated heater 140 is disposed on the PIC 120 and can also be used to attach the optical bench 160 to the PIC 120.

In some implementations, the integrated heater 140 is a resistive heater. The integrated heater 140 can be fabricated from tungsten, titanium nitride or doped silicon, including for example, SOI or polysilicon. In some implementations, the integrated heater 140 can include any suitable materials that can be used as a heater, including metal, metal alloy or suitable non-metal or non-alloy with high electrical resistance and high thermal conductance coupled to a power source or electrical contacts configured to be coupled to a power source. In some implementations, the integrated heater 140 can be defined in any metal, including copper, aluminum, or any suitable metal, or semiconductors, including silicon, germanium, or any semiconductor material that is compatible with the Complementary Metal-Oxide-Semiconductor (CMOS) processes used to fabricate the PIC 120.

In some implementations, the integrated heater 140 includes meandering or serpentine structures with a finite filament thickness and width, or segmented regions having different meandering or serpentine structures that include filaments with varying thicknesses and widths. In some implementations, to enable proper power dissipation in the integrated heater 140, the integrated heater 140 includes suitable thicknesses, widths, pitch dimensions and/or material choice that work with the available voltage and current levels that the materials can handle without causing damages to the other components on the PIC 120 or the PIC 120 itself. In some implementations, a proper thermal budget for the integrated heater 140 is about 1 W to about 50 W. In some implementations, the power dissipated or power consumed by the integrated heater 140 can be about 2 W to about 50 W, about 4 W to 30 W, or about 5 W to about 20 W, inclusive of any power values therebetween.

In some implementations, the integrated heater 140 has a filament thickness from about 10 nm to about 10 μm. In some implementations, the integrated heater 140 has a thickness from about 50 nm to about 10 μm, about 80 nm to about 8 μm, about 100 nm to about 6 μm, about 150 nm to about 4 μm, or about 200 nm to about 2 μm, inclusive of any thicknesses therebetween. In some implementations, the integrated heater 140 can be a rectangular slab of doped silicon.

In some implementations, the integrated heater 140 has a filament width from about 100 nm to about 50 μm. In some implementations, the integrated heater 140 has a filament width from about 150 nm to about 10 μm, about 150 nm to about 8 μm, about 200 nm to about 6 μm, about 200 nm to about 4 μm, or about 100 nm to about 2 μm, inclusive of any filament width values therebetween.

In some implementations, the integrated heater 140 has a pitch between filaments from about 100 nm to about 50 μm. In some implementations, the integrated heater 140 has a pitch from about 150 nm to about 10 μm, about 150 nm to about 8 μm, about 200 nm to about 6 μm, about 200 nm to about 4 μm, or about 100 nm to about 2 μm, inclusive of any pitch values therebetween.

In some implementations, some portions of the integrated heater 140 have a filament thickness that is different from other portions of the integrated heater 140. In some implementations, some portions of the integrated heater 140 has a filament width that is different from other portions of the integrated heater 140. In some implementations, the pitch can vary across the integrated heater 140 where one area of the integrated heater 140 can have a specific pitch while other areas have different pitches. In some implementations, the difference in the thickness, width or pitch of the integrated heater 140 can result in different amounts of heat generated in the regions with differing width values of the integrated heater 140. The differing amounts of heat can affect the temperature uniformity of the heated regions and can affect the melting pattern of the solder in those regions. In some implementations, the customizability, selectivity, and regionalization or localization of the heating pattern of the solder can provide additional parameters that can be used for fine-tuning the attachment process of the optical bench 160 to the PIC 120.

In some implementations, the integrated heater 140 includes a number of segments with each of the segments having filaments that have dimensions (thickness, width, and/or pitch) that are different from those in other segments. In some implementations, the structural differences in the segments of the integrated heater 140 enable generation of non-uniform heating profile that can be used to tailor customize heating of the solder 150. Similar to the aforementioned customizability of the melting pattern discussed above, various configurations of the integrated heater 140 can also provide additional parameters that can be used to control and fine-tune the attachment process of the optical bench 160 to the PIC 120. Various configurations of the integrated heater 140 are discussed in further detail with respect to FIGS. 3A and 3B.

In some implementations, the layer of solder 150 is disposed on the integrated heater 140. In some implementations, the layer of solder 150 is deposited via a deposition technology based on physical, chemical or any suitable deposition processes. In some implementations, the layer of solder 150 is electroplated. In some implementations, the layer of solder 150 is spin coated. In some implementations, the layer of solder 150 is a preform solder that is disposed on the integrated heater 140. In some implementations, using a preform solder is advantageous because it prevents the need to put an additional metallization layer on the PIC 120 that may complicate manufacturing of the apparatus 100. In some implementations, the layer of solder 150 is deposited on an underside of the optical bench 160. In some implementations, the layer of solder 150 is a preform solder that is disposed on the underside of the optical bench 160.

In some implementations, the layer of solder 150 is disposed on the integrated heater 140 and covers an entire surface of the integrated heater 140. In some implementations, the layer of solder 150 substantially covers an entire surface of the integrated heater 140. In some implementations, the layer of solder 150 substantially covers a portion of the integrated heater 140. In some implementations, the layer of solder 150 covers a central portion of the integrated heater 140. In some implementations, the layer of solder 150 covers about 50%, about 60%, about 70%, about 80%, about 90%, about 95% or about 98% of the integrated heater 140. In some implementations, the layer of solder 150 covers up to about 50%, about 60%, about 70%, about 80%, about 90%, about 95% or about 98% of the filament width of the integrated heater 140.

In some implementations, the layer of solder 150 is disposed on the underside of the optical bench 160 and covers an entire surface of the optical bench 160. In some implementations, the layer of solder 150 substantially covers an entire surface of the optical bench 160. In some implementations, the layer of solder 150 substantially covers a portion of the optical bench 160. In some implementations, the layer of solder 150 covers a central portion of the optical bench 160. In some implementations, the layer of solder 150 covers about 50%, about 60%, about 70%, about 80%, about 90%, about 95% or about 98% of the optical bench 160.

In some implementations, the layer of solder 150 has a thickness from about 10 nm to about 100 μm. In some implementations, the integrated heater 140 has a thickness from about 50 nm to about 50 μm, about 80 nm to about 20 μm, about 100 nm to about 10 μm, about 150 nm to about 5 μm, or about 200 nm to about 2 μm, inclusive of any thicknesses therebetween.

In some implementations, the layer of solder 150 includes any suitable solder material, including indium based, tin based, bismuth based, lead based solder materials, including SnAg and SnAgCu (SAC system). In some implementations, the layer of solder 150 can have a melting point below about 400° C., about 350° C., about 320° C., about 300° C., about 250° C., about 200° C., about 180° C., about 160° C., about 140° C., about 130° C., about 120° C., or about 110° C., inclusive of any melting point values therebetween.

In some implementations, upon attaching the optical bench 160 to the PIC 120, i.e., the layer of solder 150 has been melted and re-solidified to attach the optical bench 160 and the PIC 120, the gap spacing between the optical bench 160 and the PIC 120 is about 10 nm to about 80 µm, about 50 nm to about 50 µm, about 100 nm to about 10 µm, about 150 nm to about 5 µm, about 200 nm to about 2 µm, about 3 µm to about 20 µm, or about 5 µm to about 15 µm, inclusive of any spacing values therebetween.

In some implementations, a layer of gold is disposed on the surface of the optical bench 160 or the PIC 120 for better adhesion during attachment of the optical bench 160 to the PIC 120. In some implementations, the gold layer has thickness of about 1 nm to about 5 µm, about 10 nm to about 2 µm, about 10 nm to about 1 µm, about 10 nm to about 500 nm, about 1 nm to about 200 nm, about 2 nm to about 100 nm, or about 5 nm to about 50 nm, inclusive of any thickness values therebetween. In some implementations, one or more adhesion layers having Cr, Ti, W, Ni, Pt, TiW, or any combination of the metal and alloys of the metals, or any suitable layer or layers of materials that can be used for adhesion purposes, can be disposed with a layer of gold. In some implementations, the one or more adhesion layers have a thickness of about 1 nm to about 5 µm, about 10 nm to about 2 µm, about 10 nm to about 1 µm, about 10 nm to about 500 nm, about 1 nm to about 200 nm, about 2 nm to about 100 nm, or about 5 nm to about 50 nm, inclusive of any thickness values therebetween.

In some implementations, the optical bench 160 includes silicon, silicon-on-insulator, silicon nitride coated silicon, or silicon oxide coated silicon. In some implementations, the optical bench 160 is one of a silicon substrate, silicon-on-insulator substrate, silicon nitride coated silicon substrate, or silicon oxide coated silicon substrate. In other words, the optical bench 160 can be a silicon bench having any of silicon-on-insulator, silicon nitride coated silicon, or silicon oxide coated silicon. In some implementations, the optical bench 160 can be a glass bench, a quartz bench, a fused silica bench, a fused quartz bench, a sapphire bench, or any suitable material that can be used as a bench in optical systems. In some implementations, the optical bench 160 includes components, such as, for example, electrical lines, electrical contact pads, modulators, anti-reflection coatings, optical path linkup epoxy, and other optical and electrical components, such as, but not limited to a beam splitter, a power splitter, a half-wave plate, a quarter-wave plate, an isolator, a modulator, a MEMS mirror, a monitor photodiode, or any other suitable optical components that can be disposed on the surface of the optical bench 160. In some implementations, instead of an optical bench, an optical bench made of a non-silicon material is used.

In some implementations, the optical system 180 can include a laser source disposed on a laser die, a lens or a coupling lens assembly containing more than one optical element for focusing the light onto the grating coupler 130, either directly or indirectly (via one or more reflections). In some implementations, the optical system 180 can be disposed on the optical bench 160 via optical mounts or brackets, or attached via an epoxy or any other suitable bonding material. In the optical system 180, the laser source generates a light that is manipulated and/or guided by the coupling lens assembly to travel along the light path 105 and onto the grating coupler 130 of the PIC 120. In some implementations, the optical system 180 can include other optical components, such as, but not limited to a beam splitter, a prism, a steering mirror, a power splitter, a half-wave plate, a quarter-wave plate, an isolator, a modulator, a monitor photodiode, or any other suitable optical components. In some implementations, optical components, such as a wave plate that converts polarization can be included in the optical system 180.

Figure 1B:
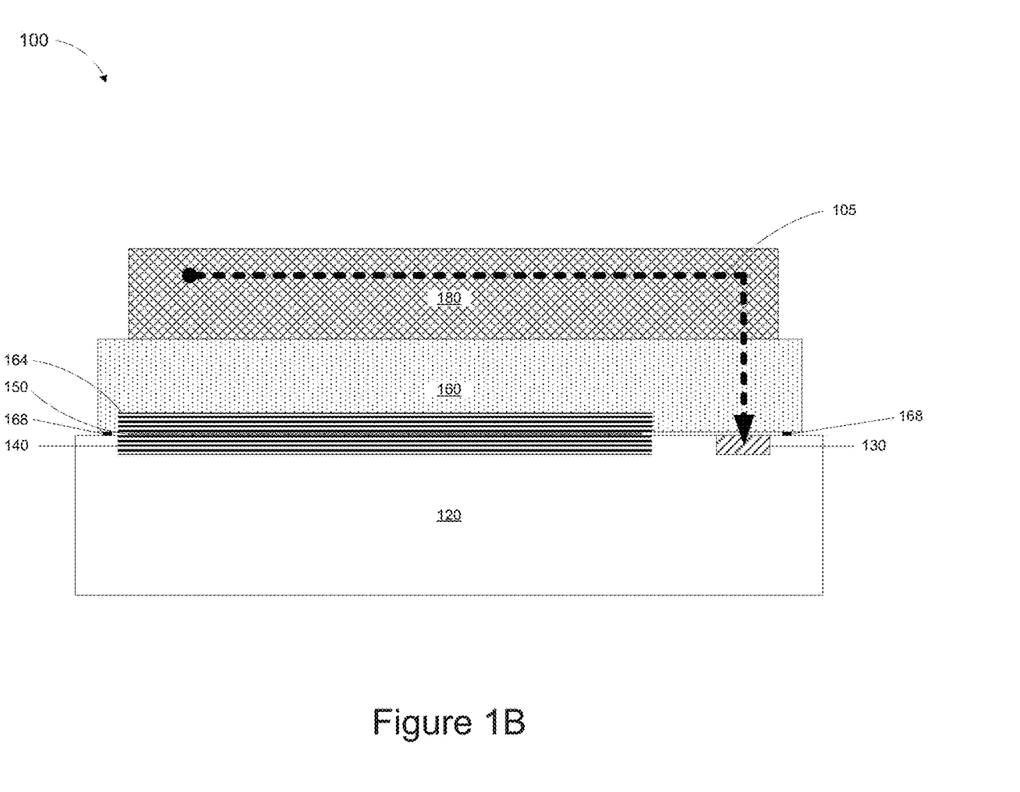
FIG. 1B shows a cross-sectional view of another implementation of a silicon photonic integrated system, according to an illustrative implementation.

FIG. 1B shows a cross-sectional view of another implementation of the silicon photonic apparatus 100 including the integrated heater 140, according to an illustrative implementation. As shown in FIG. 1B, the optical bench 160 also includes an integrated heater 164 on the bottom of the optical bench 160 to provide additional customizability, selectivity, and regionalization or localization in the heating of the solder 150 from another side of the solder 150. These additional parameters that can be used for fine-tuning the attachment process of the optical bench 160 to the PIC 120.

In some implementations, the integrated heater 164 is disposed on the optical bench 160. In some implementations, the integrated heater 164 is fabricated on the bottom surface of the optical bench 160. In some implementations, the integrated heater 164 is fabricated within the optical bench 160. In some implementations, the integrated heater 164 has a leveled surface flush with the surface of the optical bench 160. In some implementations, the integrated heater 164 is an embedded heater. In other words, the integrated heater 164 is embedded in the optical bench 160.

In some implementations, the integrated heater 164 is a resistive heater. The integrated heater 164 can be fabricated from tungsten, titanium nitride or doped silicon, including for example, SOI or polysilicon. In some implementations, the integrated heater 164 can include any suitable materials that can be used as a heater, including metal, metal alloy or suitable non-metal or non-alloy with high electrical resistance and high thermal conductance coupled to a power source or electrical contacts configured to be coupled to a power source. In some implementations, the integrated heater 164 can be defined in any metal, including copper, aluminum, or any suitable metal, or semiconductors, including silicon, germanium, or any semiconductor material that is compatible with the CMOS processes used to fabricate the optical bench 160.

In some implementations, the integrated heater 164 includes meandering or serpentine structures with a finite filament thickness and width, or segmented regions having different meandering or serpentine structures that include filaments with varying thicknesses and widths. In some implementations, to enable proper power dissipation in the integrated heater 164, the integrated heater 164 includes suitable thicknesses, widths, pitch dimensions and/or material choice that work with the available voltage and current levels that the materials can handle without causing damages to any of the optical or electronic components on the optical bench 160 or the optical bench 160 itself. In some implementations, a proper thermal budget for the integrated heater 164 is about 1 W to about 50 W. In some implementations, the power dissipated or power consumed by the integrated heater 164 can be about 2 W to about 50 W, about 4 W to 30 W, or about 5 W to about 20 W, inclusive of any power values therebetween.

In some implementations, the integrated heater 164 has a filament thickness from about 10 nm to about 10 µm. In some implementations, the integrated heater 164 has a thickness from about 50 nm to about 10 µm, about 80 nm to about 8 µm, about 100 nm to about 6 µm, about 150 nm to about 4 µm, or about 200 nm to about 2 µm, inclusive of any thicknesses therebetween. In some implementations, the integrated heater 164 can be a rectangular slab of doped silicon.

In some implementations, the integrated heater 164 has a filament width from about 100 nm to about 50 µm. In some implementations, the integrated heater 164 has a filament width from about 150 nm to about 10 µm, about 150 nm to about 8 µm, about 200 nm to about 6 µm, about 200 nm to about 4 µm, or about 100 nm to about 2 µm, inclusive of any filament width values therebetween.

In some implementations, the integrated heater 164 has a pitch between filaments from about 100 nm to about 50 µm. In some implementations, the integrated heater 164 has a pitch from about 150 nm to about 10 µm, about 150 nm to about 8 µm, about 200 nm to about 6 µm, about 200 nm to about 4 µm, or about 100 nm to about 2 µm, inclusive of any pitch values therebetween.

In some implementations, some portions of the integrated heater 164 have a filament thickness that is different from other portions of the integrated heater 164. In some implementations, some portions of the integrated heater 164 has a filament width that is different from other portions of the integrated heater 164. In some implementations, the pitch can vary across the integrated heater 164 where one area of the integrated heater 164 can have a specific pitch while other areas have different pitches. In some implementations, the difference in the thickness, width or pitch of the integrated heater 164 can result in different amounts of heat generated in the regions with differing width values of the integrated heater 164. The differing amounts of heat can affect the temperature uniformity of the heated regions and can affect the melting pattern of the solder in those regions. In some implementations, the customizability, selectivity, and regionalization or localization of the heating pattern of the solder can provide additional parameters that can be used for fine-tuning the attachment process of the optical bench 160 to the PIC 120.

In some implementations, the integrated heater 164 includes a number of segments with each of the segments having filaments that have dimensions (thickness, width, and/or pitch) that are different from those in other segments. In some implementations, the structural differences in the segments of the integrated heater 164 enable generation of non-uniform heating profile that can be used to tailor customize heating of the solder 150. Similar to the aforementioned customizability of the melting pattern discussed above, various configurations of the integrated heater 164 can also provide additional parameters that can be used to control and fine-tune the attachment process of the optical bench 160 to the PIC 120. Various configurations of the integrated heater 164 are discussed in further detail with respect to FIGS. 3A and 3B.

Figure 1C:
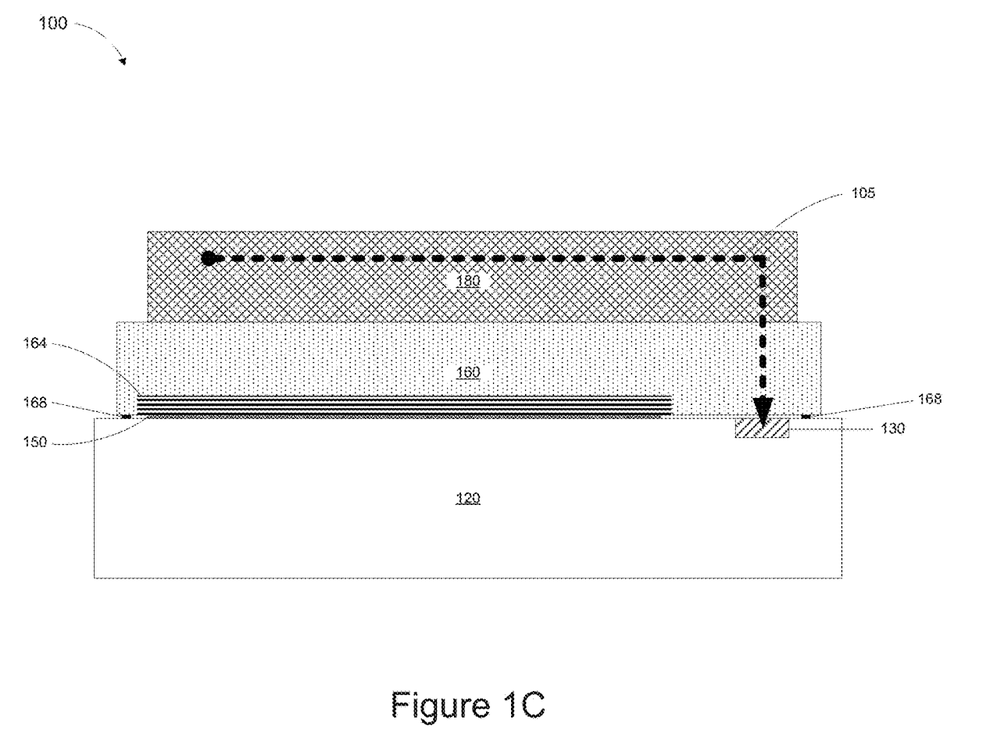
FIG. 1C shows a cross-sectional view of another implementation of a silicon photonic integrated system, according to an illustrative implementation.
Figure 1D:
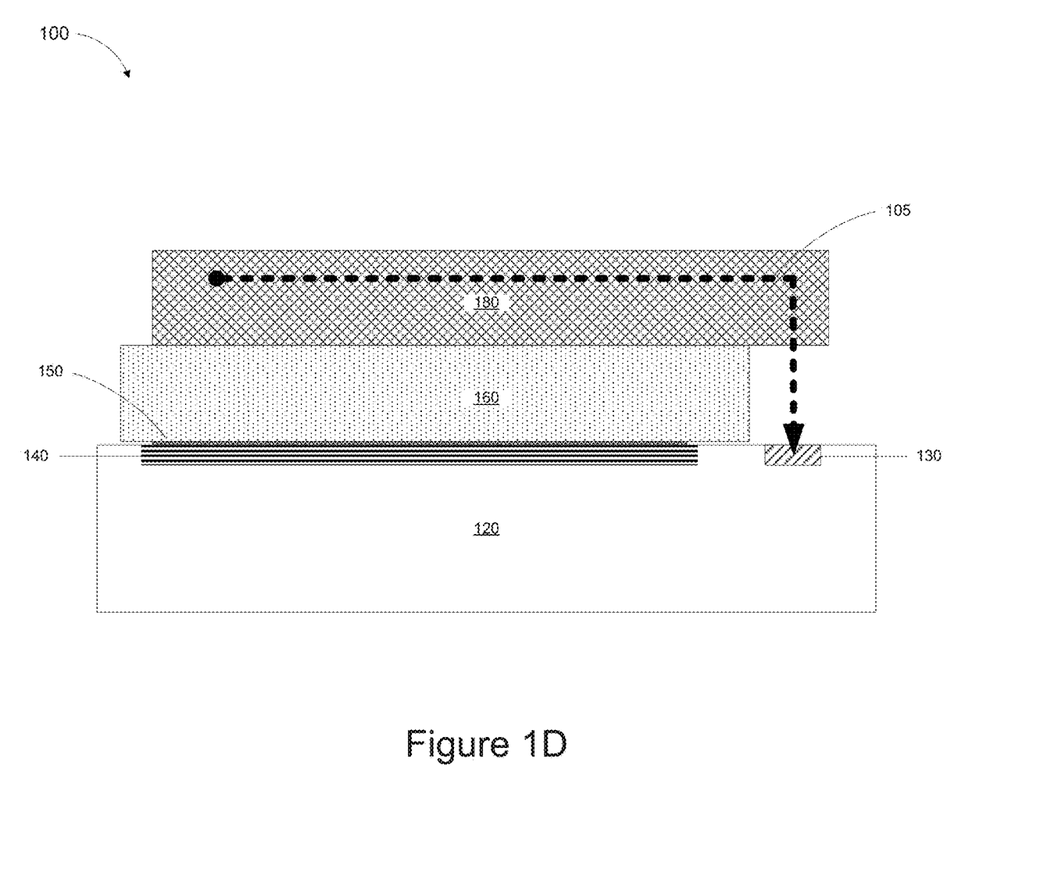
FIG. 1D shows a cross-sectional view of another implementation of a silicon photonic integrated system, according to an illustrative implementation.

FIG. 1C shows a cross-sectional view of another implementation of the silicon photonic apparatus 100 including the integrated heater 140, according to an illustrative implementation. As shown in FIG. 1C, the apparatus 100 includes the PIC 120 having no integrated heater 140 and the optical bench 160 having at least one integrated heater 164 disposed on the optical bench 160 for heating the solder 150. FIGS. 1A and 1D show example implementations where the apparatus 100 includes the PIC 120 having at least one integrated heater 140 disposed on the PIC 120 and the optical bench 160 having no integrated heater 164 disposed on the optical bench 160 for heating the solder 150. FIG. 1B shows an example implementation where the apparatus 100 includes both the PIC 120 having at least one integrated heater 140 disposed on the PIC 120 and the optical bench 160 having at least one integrated heater 164 disposed on the optical bench 160 for heating the solder 150.

As shown in FIGS. 1B and 1C, the optical bench 160 includes a plurality of pedestals 168. In some implementations, the plurality of pedestals 168 can include electrical conducting materials to provide an electrical current to the integrated heater 164 on the optical bench 160. In some implementations, the plurality of pedestals 168 include any electrically conducting materials, including, but not limited to, copper, aluminum, or any suitable electrically conducting metal or semiconductor, for example, doped silicon, that is compatible with the CMOS processes used to fabricate the PIC 120. In some implementations, the plurality of pedestals 168 are configured to attach a set of electrical contact pads (not shown) on the PIC 120 to provide an electrical current from the PIC 120 to the integrated heater 164 on the optical bench 160 upon attaching the optical bench 160 to the PIC 120. In some implementations, the PIC 120 includes one or more portions (not shown) that extend out from the surface of the PIC 120 to provide electrical contacting points for the integrated heater 164 of the optical bench 160.

In some implementations, the optical bench 160 includes one or more through-silicon-vias (TSVs) from the top of the optical bench 160 to the underside of the optical bench 160 where the integrated heater 164 is located to provide an electrical current. In some implementations, the one or more TSVs include isolated pads (not shown) on the top of the optical bench 160 to isolate electrical conduction to the integrated heater 164 from other parts of the optical bench 160. In some implementations, the isolated pads can be electrically connected to an external power source to provide the electrical current.

In some implementations, the plurality of pedestals 168 are disposed on the underside of the optical bench 160 to provide a constant spacing between the optical bench 160 and the PIC 120 to ensure a constant path length for the light path 105 between the laser source in the optical system 180 and the grating coupler 130 on the PIC 120. In some implementations, the pedestals 168 are utilized taking into account the thickness of the solidified layer of solder 150 disposed between the optical bench 160 and the PIC 120. In some implementations, the height of the pedestals 168 is used as the gap spacing between the optical bench 160 and the PIC 120, within which the melted layer of solder 150 can be re-solidified.

FIG. 1D shows a cross-sectional view of another implementation of the silicon photonic apparatus 100 including the integrated heater 140, according to an illustrative implementation. According to the implementation shown in FIG. 1D, the light from the laser source of the optical system 180 does not travel through the optical bench 180. Since the silicon is not transparent to all wavelengths, the implementation illustrated in FIG. 1D can be used for wavelengths of light to which silicon is not transparent.

Figure 1E:
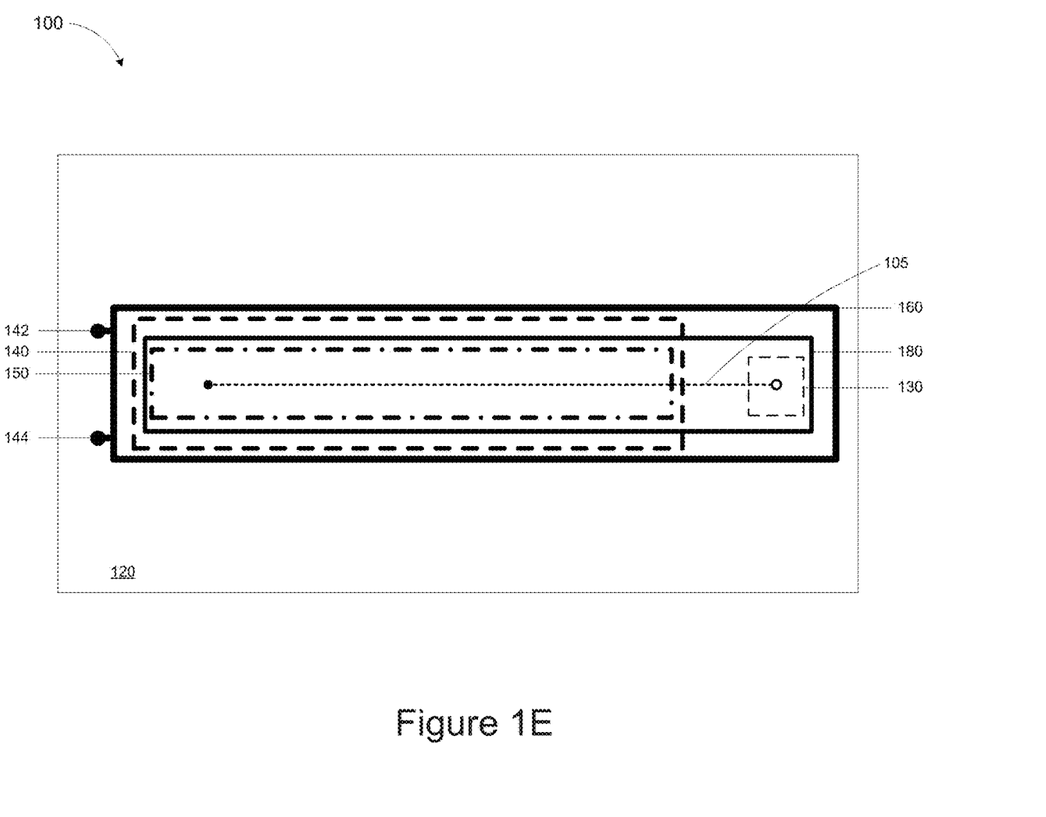
FIG. 1E shows a plan view of an implementation of a silicon photonic integrated system, according to an illustrative implementation.

FIG. 1E shows a plan view of an implementation of the silicon photonic apparatus 100 including the integrated heater 140, according to an illustrative implementation. As shown in the figure, the apparatus 100 also includes a set of electrical contact pads 142 and 144 that are connected to the integrated heater 140. FIG. 1E shows lateral dimensions of each of the components in the apparatus 100 to indicate relative sizes of the various components as described herein. For example, an entirety of the optical bench 160 can fit onto the top surface of the PIC 120. Similarly, the optical system 180 can also fit all, some, or most of the optical components onto the optical bench 160. The relative sizes of the dashed boxes indicate that the layer of solder 150 covers a majority of the surface area of the integrated heater 140. The filled dot of the light path 105 indicates the source of the light and the open dot indicates the location of the focused light on the grating coupler 130.

Figure 2:
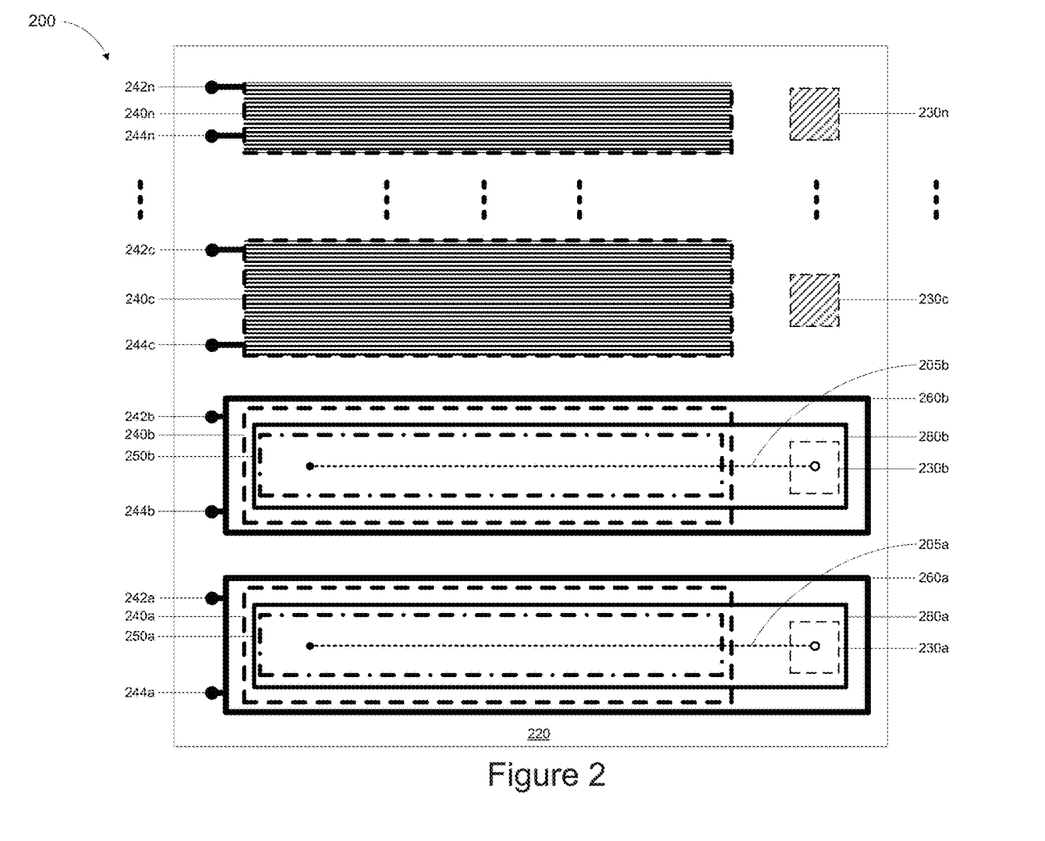
FIG. 2 shows a plan view of an implementation of a silicon photonic integrated system, according to an illustrative implementation.

FIG. 2 shows a plan view of an implementation of a silicon photonic apparatus 200, according to an illustrative implementation. In some implementations, the apparatus 200 can include a PIC 220 that includes multiple integrated heaters 240a, 240b, 240c, . . . , (also referred to herein as integrated heaters 240) and multiple grating couplers 230a, 230b, 230c, . . . (also referred to herein as grating couplers 230). In some implementations, each of the multiple integrated heaters 240 has a set of electrical contact pads for coupling an external power source (not shown) to the heater 240. For example, the integrated heater 240a has electrical contact pads 242a and 244a, the integrated heater 240b has electrical contact pads 242b and 244b, and the integrated heater 240c has electrical contact pads 242c and 244c. Vertical 3-dotted dashed lines indicate that there are "n" sets of integrated heaters 240n and "n" sets of grating couplers 230n. Accordingly, the $n^{th}$ integrated heater 240n has its own electrical contact pads 242n and 244n. As shown in FIG. 2, the apparatus 200 also includes layers of solder 250a and 250b (also referred to herein as layers of solder 250), optical benches 260a and 260b (also referred to herein as optical benches 260), and optical systems 280a and 280b (also referred to herein as optical systems 280) disposed respectively on the optical benches 260a and 260b. FIG. 2 also shows individual light paths 205a and 205b from individual light sources (not shown) in the respective optical systems 280a and 280b that are directed onto the respective grating couplers 230a and 230b of the PIC 120.

In some implementations, the "n" sets can accommodate "n" respective optical benches. In some implementations, any of the example implementations or configurations illustrated and described with respect to FIGS. 1A, 1B, 1C and 1D are applicable with the apparatus 200 of FIG. 2. For example, the apparatus 200 can attach multiple optical benches 260, each of which can have one of the optical systems 280 that operates in a specific wavelength while the other optical systems 280 operate at different wavelengths. In some implementations, the PIC 220 can be concurrently attached to any of the optical bench configuration as shown in FIG. 1A, the optical bench configuration as shown in FIG. 1B, or the optical bench configuration as shown in FIG. 1C or a combination thereof.

Since all the relevant properties, dimensions and general characteristics of each of the components, such as the PIC 220, the grating couplers 230, the integrated heaters 240, the layers of solder 250, the optical benches 260, and the optical systems 280 used in the apparatus 200 are similar or substantially similar to those in the apparatus 100, the details of each of the components in the apparatus 200 can be found in the descriptions of like components in the apparatus 100 with respect to FIGS. 1A, 1B, 1C and 1D.

Figure 3A:
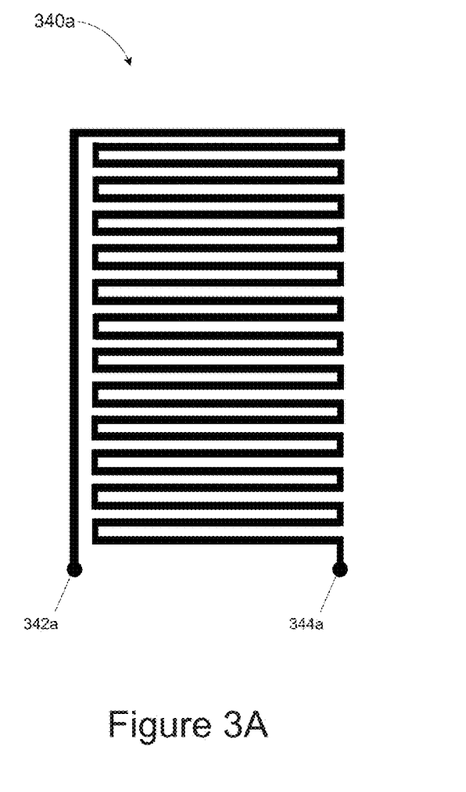
FIGS. 3A and 3B are schematic illustrations of various configurations of an integrated heater.
Figure 3B:
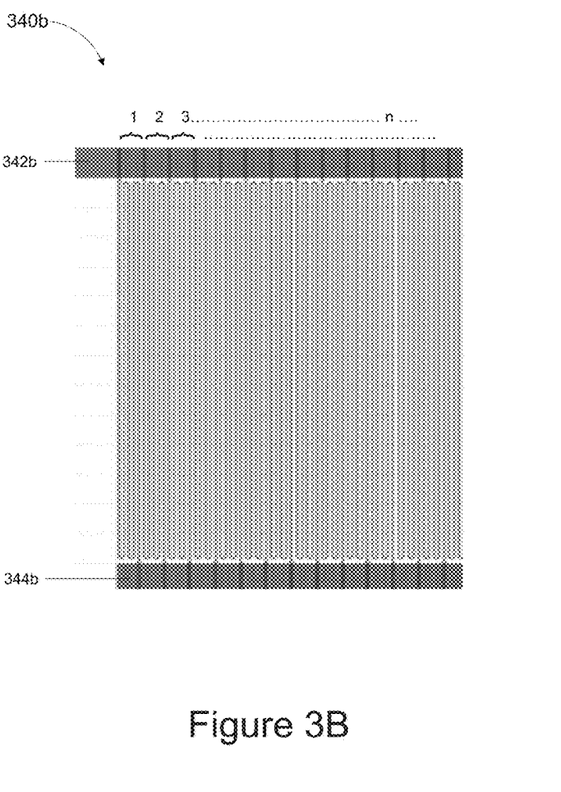

FIGS. 3A and 3B are schematic illustrations of various configurations of integrated heaters 340a and 340b suitable for use in silicon photonic integrated devices, including, for example, in the PIC 120 as well as in the optical bench 160. As shown in FIG. 3A, the integrated heater 340a includes a single meandering serpentine structure with two contact pads 342a and 344a for electrical current input and output. In some implementations, the single uniform serpentine structure provides a uniform heating profile that can distribute the heat across the surface of the integrated heater 340a.

In some implementations, a set of metal traces (not shown) that can be placed on the integrated heater 340a to further distribute or spread the heat generated by the integrated heater 340a to melt a solder (not shown) disposed on the integrated heater 340a.

Shown in FIG. 3B is the integrated heater 340b that includes multiple segments 1, 2, 3, . . . , n, with each of the segments having different filament dimensions (thickness, width, and/or pitch). In some implementations, the integrated heater 340b also includes metal rails 342b and 344b as electrical contact pads to input the current. As shown in the figure, the contacting points for external electrical leads (not shown) can be anywhere along the metal rails 342b and 344b. In some implementations, the structural differences in the segments of the integrated heater 340b can enable generation of a non-uniform heating profile across the surface of the integrated heater 340b, enabling fine local control of the heating profile in melting the solder disposed on the integrated heater 340b.

Table 1 below shows example configurations of the integrated heaters 340a and 340b and their performance metrics. As shown in the Table, various configurations are evaluated for their performance in terms of power consumption for each of the configurations. For example, the power consumption scales with the total resistance of the integrated heater, for a given maximum current. The resistance of the integrated heater also depends on the number of

| Configuration | Lines/ segment | Line spacing (μm) | Number of segments | Total resistance (Ohm) | Total power (Watt) |
| --- | --- | --- | --- | --- | --- |
| 1 | 5 | 6 | 63 | 43 | 3.13 |
| 2 | 7 | 6 | 45 | 84 | 6.14 |
| 3 | 9 | 6 | 35 | 139 | 10.15 |
| 4 | 11 | 6 | 28 | 213 | 15.51 |
| 5 | 5 | 8 | 47 | 58 | 4.20 |
| 6 | 7 | 8 | 33 | 115 | 8.38 |
| 7 | 9 | 8 | 26 | 188 | 13.67 |
| 8 | 11 | 8 | 21 | 284 | 20.68 |
| 9 | 5 | 10 | 38 | 71 | 5.20 |
| 10 | 7 | 10 | 27 | 140 | 10.24 |
| 11 | 9 | 10 | 21 | 232 | 16.92 |
| 12 | 11 | 10 | 17 | 350 | 25.55 | filament (lines) per segment, line spacing and line width of the heater.

Figure 4:
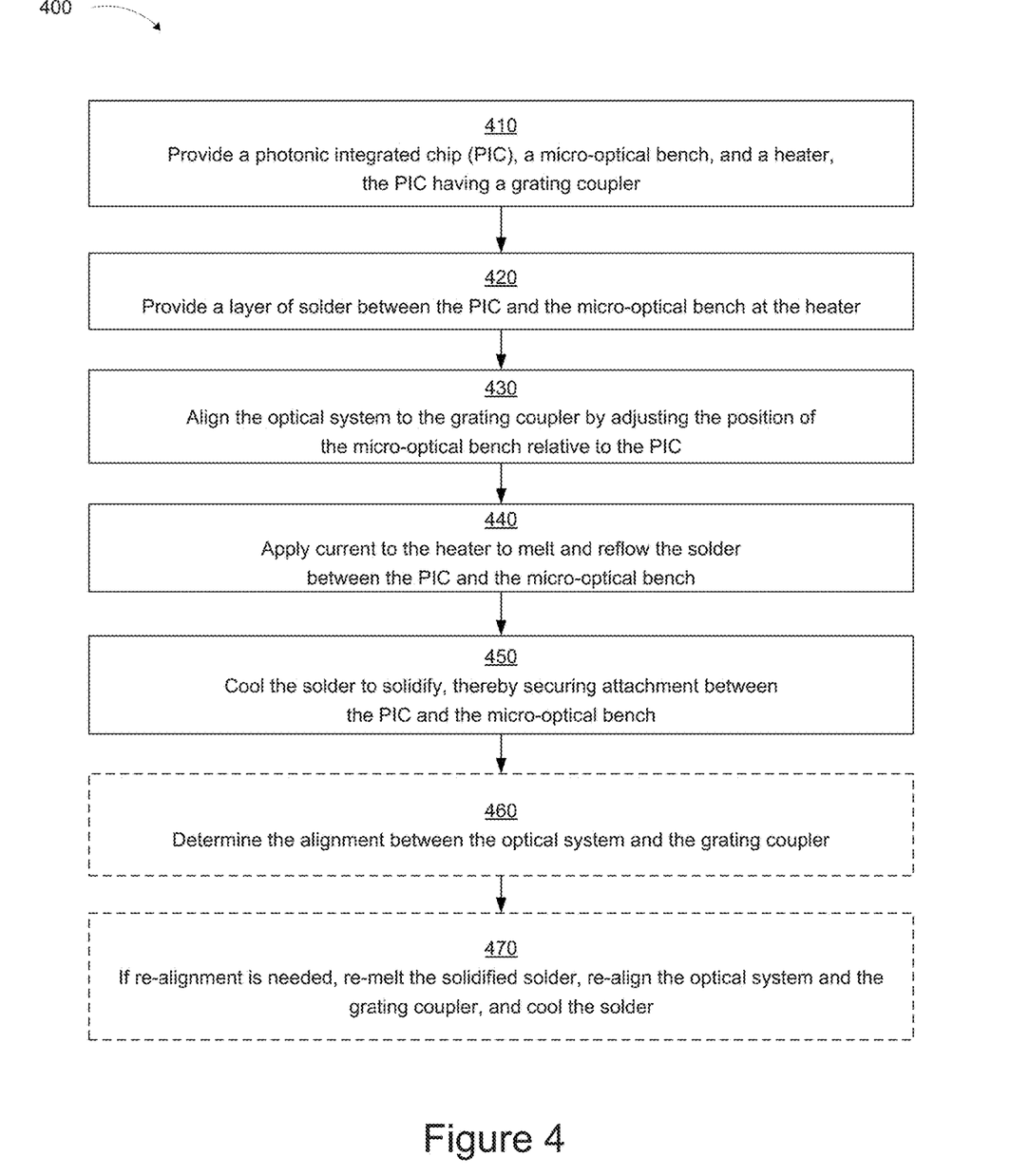
FIG. 4 is a flowchart of an example method of soldering in a silicon photonic integrated system, according to an illustrative implementation.

FIG. 4 is a flowchart of an example method of coupling an optical bench to a PIC, according to an illustrative implementation. The method 400 includes providing a PIC, an optical bench, and a heater, where the PIC comprises a grating coupler (stage 410). In some implementations, the method 400 includes providing a layer of solder between the PIC and the optical bench at the heater (stage 420). In some implementations, the heater is integrated into the PIC. In some implementations, the heater is integrated into the optical bench. In some implementations, stage 410 and stage 420 can be combined into a single step wherein the optical bench or the optical bench has a layer of solder predisposed on an underside of the optical bench or the PIC has a layer of solder predisposed on the upper side of the PIC. In some implementations, the method 400 includes aligning the optical system to the grating coupler by adjusting the position of the optical bench relative to the PIC (stage 430). In some implementations, the method 400 includes applying a current to the integrated heater to melt and reflow the solder between the PIC and optical bench (stage 440). In some implementations, the method 400 includes cooling the solder to reach a solid state, thereby securing attachment between the PIC and the optical bench (stage 450). In some implementations, prior to the cooling of the solder to solidify, the method further includes adjusting the optical bench relative to the PIC while the solder is molten. In some implementations, the adjusting includes moving or rotating the optical bench so as to further align the optical system to the grating coupler. In some implementations, the heating of the embedded heater includes applying a current across the embedded heater. In some implementations, a current is also applied to the PIC and the optical bench to provide an additional control over the liquidus time of the solder during melting and solidification.

In some implementations, the method further includes determining a misalignment between the optical system and the grating coupler. In some implementations, the method 400 can optionally include determining the alignment between the optical system and the grating coupler (stage 460). In some implementations, the PIC can include one or multiple monitor photodiodes (MPDs) (not shown) to provide feedback during alignment of the optical bench to the PIC. In some implementations, the MPD current reading can be used to determine if there is misalignment. If the alignment is proper, the attachment of the optical bench to the PIC is considered successful. If the alignment is improper, an adjustment may be needed to correct the placement of the optical bench on the PIC so that the optical system and the grating coupler are in aligned.

In some implementations, if re-alignment is needed, the method 400 optionally includes re-melting the solidified solder, re-aligning the optical system and the grating coupler, and cooling the solder (stage 470). In other words, stage 470 is optionally included in the method 400 for realigning the optical system on the optical bench with the grating coupler on the PIC in response to the misalignment between the optical system and the grating coupler. To conduct the re-alignment, stage 470 includes re-heating and melting a solidified solder between the PIC and the optical bench by applying a current across the integrated heater. Stage 470 further includes repositioning of the optical bench relative to the PIC while the solder is molten to re-align the optical system to the grating coupler. The molten solder is then cooled to allow the solder to solidify so that the optical bench is now fixed in the aligned position.

In some implementations, the device that is created according to the method 400 of FIG. 4 can include a plurality of integrated heaters for attaching a plurality of optical benches. If the measurement of alignment determines that alignment of a particular optical bench is not proper, that is for any optical bench that is misaligned, a current can be applied to the respective integrated heater to re-melt the solder of the particular misaligned optical bench so that re-alignment procedure can be performed on the misaligned optical bench without affecting the alignment or fixation of other optical benches. In some implementations, if any of the optical benches is defective or needs to be removed for any particular reason, a current can be applied to the respective integrated heater to re-melt the solder of the defective optical bench so that a new or replacement optical bench can be installed without affecting the alignment or fixation of other optical benches.

In some implementations, the integrated heater used in the method 400 can include tungsten, titanium nitride or doped silicon. In some implementations, the integrated heater has a thickness from about 100 nm to about 10 µm. In some implementations, the integrated heater has a meandering or serpentine structure having a width from about 100 nm to about 10 µm.

In some implementations, the integrated heater is a first integrated heater and the PIC further includes a second integrated heater, wherein the second integrated heater is electrically isolated from the first integrated heater. In some implementations, a current is applied to the first integrated heater without applying a current to the second integrated heater. In some implementations, a current is applied to the second integrated heater without applying a current to the first integrated heater. In some implementations, the optical bench is a first optical bench, the layer of the solder is a first layer of solder, the apparatus further comprises a second optical bench and a second layer of solder.

In some implementations, the method further includes disposing the second layer of solder adjacent the second integrated heater between PIC and the second optical bench. In some implementations, the method further includes heating the second integrated heater so as to melt and reflow the second layer of solder between the PIC and the second optical bench. In some implementations, the method further includes cooling the second layer of solder to a solid state, thereby securing attachment between the PIC and the second optical bench.

In some implementations of the method 400, the solder is disposed between the optical bench and the PIC. In some implementations of the method 400, the solder and an indexing matching optical path link up epoxy are disposed between the optical bench and the PIC. In some implementations of the method 400, the solder and an antireflective coating are disposed between the optical bench and the PIC. In some implementations of the method 400, the solder, an indexing matching optical path link up epoxy, and an antireflective coating are disposed between the optical bench and the PIC. In some implementations of the method 400, the bottom surface of the optical bench or the top surface of the PIC has one of an antireflection coating or an optical path link up epoxy. In some implementations of the method 400, the bottom surface of the optical bench or the top surface of the PIC has an antireflection coating and an optical path link up epoxy.

In some implementations of the method 400, the solder can be deposited, plated or disposed as a preform solder prior to application of current in stage 440. In some implementations of the method 400, the integrated heater can also be used to cure the indexing matching optical path link up epoxy.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. An apparatus comprising:
   a photonic integrated circuit (PIC), the PIC having at least one grating coupler disposed thereon;
   an optical bench;
   an optical system disposed on a top surface of the optical bench;
   an integrated heater at an upper surface of the PIC under the optical bench or at a bottom surface of the optical bench over the PIC; and
   a layer of solder disposed between the PIC and the optical bench for coupling the bottom surface of the optical bench to the PIC,
   wherein the layer of solder is in thermal communication with the integrated heater.

2. The apparatus of claim 1, wherein the optical bench is positioned on the PIC so as to align the optical system to the at least one grating coupler of the PIC.

3. The apparatus of claim 1, wherein the integrated heater comprises tungsten, titanium nitride or doped silicon.

4. The apparatus of claim 1, wherein the integrated heater has a plurality of segments with varying filament dimensions and has a thickness from about 100 nm to about 10 μm or has a meandering or serpentine structure having a width from about 100 nm to about 10 μm.

5. The apparatus of claim 1, wherein the integrated heater is at the bottom surface of the optical bench and in thermal communication with the layer of solder.

6. The apparatus of claim 1, wherein the integrated heater is at the upper surface of the PIC.

7. The apparatus of claim 6, comprising a second integrated heater at the bottom surface of the optical bench on an opposite side of the layer of solder from the integrated heater.

8. The apparatus of claim 6, wherein the integrated heater is a first integrated heater, the apparatus further comprises a second integrated heater, wherein the second integrated heater is electrically isolated from the first integrated heater.

9. The apparatus of claim 8, wherein the optical bench is a first optical bench, the apparatus further comprises a second optical bench and a second layer of solder disposed between the PIC and the second optical bench for coupling the second optical bench to the PIC.

10. The apparatus of claim 1, wherein the bottom surface of the optical bench or the top surface of the PIC has one of an antireflective coating or an optical path link up epoxy.

11. A method of assembling a photonic assembly, the method comprising:
    providing a photonic integrated circuit (PIC) having at least one grating coupler disposed thereon;
    providing an optical bench having an optical system disposed thereon;
    providing an integrated heater at an upper surface of the PIC or at a bottom surface of the optical bench;
    providing a layer of solder between the PIC and the optical bench at the integrated heater;
    positioning the optical bench on top of the layer of solder;
    aligning the optical system to the grating coupler by adjusting a position of the optical bench relative to the PIC;
    heating the integrated heater to melt and reflow the solder between the PIC and the optical bench; and
    cooling the solder, allowing it to solidify, thereby securing attachment between the PIC and the optical bench.

12. The method of claim 11, prior to the cooling of the solder, the method comprises:
    adjusting position of the optical bench relative to the PIC while the solder is molten.

13. The method of claim 11, wherein the adjusting includes moving or rotating the optical bench so as to further align the optical system to the grating coupler.

14. The method of claim 11, wherein the heating of the integrated heater includes applying a current across the integrated heater.

15. The method of claim 11, further comprising:
    determining a misalignment between the optical system and the grating coupler.

16. The method of claim 15, further comprising:
    realigning the optical system on the optical bench with the grating coupler on the PIC in response to the misalignment between the optical system and the grating coupler.

17. The method of claim 15, further comprising:
    re-melting a solidified solder between the PIC and the optical bench by applying a current across the integrated heater.

18. The method of claim 17, further comprising:
    repositioning of the optical bench relative to the PIC while the solder is molten so as to re-align the optical system to the grating coupler.

19. The method of claim 11, wherein the integrated heater is at the bottom surface of the optical bench and in thermal communication with the layer of solder.

20. The method of claim 11, wherein the integrated heater is at the upper surface of the PIC.

21. The method of claim 11, wherein the integrated heater is a first integrated heater, the photonic assembly further comprises a second integrated heater, wherein the second integrated heater is electrically isolated from the first integrated heater, and wherein the optical bench is a first optical bench, the layer of the solder is a first layer of solder, the apparatus further comprises a second optical bench and a second layer of solder, the method further comprising:
    disposing the second layer of solder between the PIC and the second optical bench adjacent the second integrated heater;

heating the second integrated heater so as to melt and reflow the second layer of solder between the PIC and the second optical bench; and cooling the second layer of solder, allowing the second layer of solder to solidify, thereby securing attachment between the PIC and the second optical bench.

22. The method of claim 21, further comprising:

detecting a misalignment of the second optical bench;

reheating the second layer of solder, without reheating the layer of solder, to melt the second layer of solder;

realigning the second optical bench while the second layer of solder has been re-melted; and allowing the second layer of solder to cool to a solid state, reestablishing the connection between the PIC and the second optical bench.

23. An apparatus comprising:

a photonic integrated circuit (PIC) having a plurality of grating couplers disposed on the PIC, a plurality of optical benches, each having an optical system disposed on its surface and corresponding to one of the plurality of grating couplers;

a plurality of integrated heaters, each located at an upper surface of the PIC under a corresponding optical bench or at a bottom surface of the corresponding optical bench over the PIC;

wherein the plurality of integrated heaters are electrically isolated from one another; and a plurality of layers of solder disposed between the PIC and corresponding optical benches for coupling the plurality of optical benches to the PIC.

24. The apparatus of claim 23, wherein the plurality of optical benches are positioned on the PIC so as to align the optical systems on each optical bench to corresponding grating couplers of the plurality of grating couplers.

* * * * *